United States Patent
Adler et al.

(10) Patent No.: US 10,587,577 B2
(45) Date of Patent: Mar. 10, 2020

(54) DYNAMIC, EVENT-DRIVEN TRAFFIC CONTROL IN A MANAGED NETWORK

(71) Applicant: ServiceNow, Inc., Santa Clara, CA (US)

(72) Inventors: Michael Adler, Los Altos, CA (US); Anton Cheltsov, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 177 days.

(21) Appl. No.: 15/716,681

(22) Filed: Sep. 27, 2017

(65) Prior Publication Data
US 2019/0097973 A1    Mar. 28, 2019

(51) Int. Cl.
H04L 29/06    (2006.01)

(52) U.S. Cl.
CPC ...... H04L 63/0236 (2013.01); H04L 63/0281 (2013.01); H04L 63/1425 (2013.01); H04L 63/166 (2013.01); H04L 63/0471 (2013.01); H04L 63/1441 (2013.01); H04L 63/20 (2013.01)

(58) Field of Classification Search
CPC . H04L 63/0236; H04L 63/20; H04L 63/0281; H04L 63/166
See application file for complete search history.

(56) References Cited

U.S. PATENT DOCUMENTS

| | | | |
|---|---|---|---|
| 7,100,020 B1 * | 8/2006 | Brightman | H04L 49/10 709/231 |
| 7,809,128 B2 * | 10/2010 | Li | H04L 29/06027 370/395.21 |
| 8,387,145 B2 | 2/2013 | Xie et al. | |
| 8,726,385 B2 * | 5/2014 | Liebmann | H04L 63/0236 726/23 |
| 8,838,773 B1 | 9/2014 | Sekhar et al. | |
| 8,844,019 B2 * | 9/2014 | Barkai | H04L 63/0281 726/12 |

(Continued)

FOREIGN PATENT DOCUMENTS

CN    105608381 A    5/2016

OTHER PUBLICATIONS

ServiceNow Documentation, downloaded Sep. 12, 2017 from https://docs.servicenow.com/bundle/jakarta-servicenow-plafform/page/administer/edge-encryption/reference/edge-encryption.html (112 pages).

Primary Examiner — Abu S Sholeman
(74) Attorney, Agent, or Firm — Fletcher Yoder PC

(57) ABSTRACT

A gateway device disposed within a managed network may be communicatively coupled to a computational instance of a remote network management platform. The gateway device may also be configured with a list of network addresses assigned to the managed network, and configured to: receive network traffic from computing devices on the managed network, compare source addresses of the network traffic to the network addresses in the list, discard a first unit of the network traffic that has source addresses that are specified in the list, and for a second unit of the network traffic with source addresses that are not specified by the list, (i) encrypt, as a whole, payloads of each packet of the second unit of the network traffic, and (ii) transmit the encrypted packets from the gateway device to the computational instance. Network addresses in the list may be provided by a gateway controller device.

20 Claims, 12 Drawing Sheets

(56) References Cited

U.S. PATENT DOCUMENTS

| | | | |
|---|---|---|---|
| 8,893,278 B1* | 11/2014 | Chechik | H04L 63/145 |
| | | | 713/188 |
| 2014/0136633 A1* | 5/2014 | Murillo, Jr. | H04L 51/24 |
| | | | 709/206 |
| 2014/0189861 A1* | 7/2014 | Gupta | H04L 63/08 |
| | | | 726/22 |
| 2017/0104723 A1 | 4/2017 | Merritt | |
| 2017/0126638 A1 | 5/2017 | Ye et al. | |

* cited by examiner

DYNAMIC, EVENT-DRIVEN TRAFFIC CONTROL IN A MANAGED NETWORK

BACKGROUND

A remote network management platform may allocate one or more computational instances for a managed network, through which various aspects of the managed network can be monitored and controlled. Communication between the managed network and the remote network management platform may take place over a wide-area network such as the Internet. As such, it may be beneficial to route some or all traffic between the managed network and remote network management platform through a gateway device disposed within the managed network. The gateway device may apply consistent policies, such as encryption and traffic control, to this network traffic.

SUMMARY

Remotely managed networks may receive a number of benefits due to their integration with a remote network management platform. Some of these include improved workflow, device management, and rapid application deployment. Still, a managed network is subject to unique challenges inherent to this environment.

The managed network may assign one or more subnets of network addresses to its computational instance on the remote network management platform. This way, devices on the managed network can communicate with devices within the computational instance as if these devices were co-located and not separated by a wide-area network. The gateway device in the managed network may route and/or tunnel network traffic between the managed network and computational instance.

Given this architecture, penetration testing performed by the managed network may trigger alarms at the remote network management platform. In particular, operators of the managed network may, from time to time, perform automated or semi-automated scans for applications executing on devices assigned to subnets of the network addresses. The penetration testing may seek to reveal whether there are any known or potential security defects at these devices or applications. Any found defects may be flagged for further investigation as potential security threats.

While penetration testing is a useful technique for determining the security level of a managed network with respect to various threats, any such scans performed against the network addresses assigned to the computational instance can be problematic. In particular, the remote network management platform may view these scans as a potential attack; i.e., that an attacker has established a foothold in the managed network and is seeking to obtain illicit access to the remote network management platform. In response, the remote network management platform might shut down access to part or all of the computational instance, and deploy resources to investigate the root cause of the observed threat. In the mean time, users of the managed network may be unable to access critical network services hosted on the computational instance.

The embodiments herein overcome these drawbacks and limitations by allowing the gateway device to be configured with a list of network addresses. Any network traffic with a source address on the list and a destination address assigned to the computational instance may be discarded by the gateway device. Thus, the list can be configured to include network addresses of devices that perform penetration testing, as well as those of other devices that do not need to access resources of the computational instance.

Furthermore, this list can be dynamically updated based on input from security devices (e.g., firewalls, intrusion detection systems, intrusion prevention systems, and security policy servers) on the managed network. In this manner, devices that may be compromised in some fashion can be automatically blocked from accessing the computational instance.

Additionally, for transactions involving devices with network addresses that are not on the list, the gateway device may be configured to encrypt specific data fields and files that are to be stored in association with a database in the computational instance. Thus, the gateway may also facilitate storing sensitive data in the computational instance in a way that cannot be deciphered by the remote network management platform.

Accordingly, a first example embodiment may involve a gateway device disposed within a managed network and communicatively coupled to a computational instance of a remote network management platform. The gateway device may be configured with a list of network addresses assigned to the managed network. The gateway device may be configured to: receive network traffic from computing devices on the managed network, where the network traffic specifies destinations within the computational instance; compare source addresses of the network traffic to the network addresses in the list; discard a first unit of the network traffic, where the first unit of the network traffic has source addresses that are specified in the list; and for a second unit of the network traffic with source addresses that are not specified by the list, (i) encrypt, as a whole, payloads of each packet of the second unit of the network traffic, and (ii) transmit the encrypted packets from the gateway device to the computational instance. A gateway controller device may be disposed within the managed network and communicatively coupled to the gateway device. The gateway controller device may be configured to: obtain security event log data that specifies an additional network address assigned to a particular computing device on the managed network, where the particular computing device is suspected of violating a security policy; and transmit, to the gateway device, an instruction to update the list to include the additional network address specified by the security event log data.

A second example embodiment may involve receiving, by a gateway device disposed within a managed network and communicatively coupled to a computational instance of a remote network management platform, network traffic from computing devices on the managed network. The network traffic may specify destinations within the computational instance. The gateway device may be configured with a list of network addresses assigned to the managed network. The second example embodiment may also involve discarding, by the gateway device, a first unit of the network traffic. The first unit of the network traffic may have source addresses that are specified in the list. For a second unit of the network traffic with source addresses that are not specified by the list, the gateway device may (i) encrypt, as a whole, payloads of each packet of the second unit of the network traffic, and (ii) transmit the encrypted packets from the gateway device to the computational instance. The second example embodiment may also involve receiving, by the gateway device and from a gateway controller device, an instruction to update the list to include an additional network address. The additional network address may be derived from security event log data that specifies the additional network address. The additional network address may be assigned to a particular computing device on the managed network that is suspected of violating a security policy. The second example embodiment may also involve updating, by the gateway device, the list to include the additional network address.

A third example embodiment may involve receiving, by a gateway device disposed within a managed network and communicatively coupled to a computational instance of a remote network management platform, a representation of a particular database field or file type. The computational instance may contain a database that defines the particular database field and/or or supports storage of the file type. The third example embodiment may also involve receiving, by the gateway device, network traffic from computing devices on the managed network. The network traffic may specify destinations within the computational instance. The gateway device may be configured with a list of network addresses assigned to the managed network. The third example embodiment may also involve determining, by the gateway device, that a unit of the network traffic has a source address that is not specified in the list and is to be encrypted using a first type of cryptography. The third example embodiment may also involve, possibly in response to determining that the unit of the network traffic has the source address that is not specified in the list, the gateway device: (i) parsing the unit of the network traffic for data classified in the particular database field or the file type, (ii) individually encrypting the data classified in the particular database field or the file type using a second type of cryptography, (iii) encrypting, as a whole, payloads of each packet of the unit of the network traffic using the first type of cryptography, and (iv) transmitting the encrypted packets from the gateway device to the computational instance.

In a fourth example embodiment, an article of manufacture may include a non-transitory computer-readable medium, having stored thereon program instructions that, upon execution by a computing system, cause the computing system to perform operations in accordance with the first, second, and/or third example embodiment.

In a fifth example embodiment, a computing system may include at least one processor, as well as memory and program instructions. The program instructions may be stored in the memory, and upon execution by the at least one processor, cause the computing system to perform operations in accordance with the first, second, and/or third example embodiment.

In a sixth example embodiment, a system may include various means for carrying out each of the operations of the first, second, and/or third example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
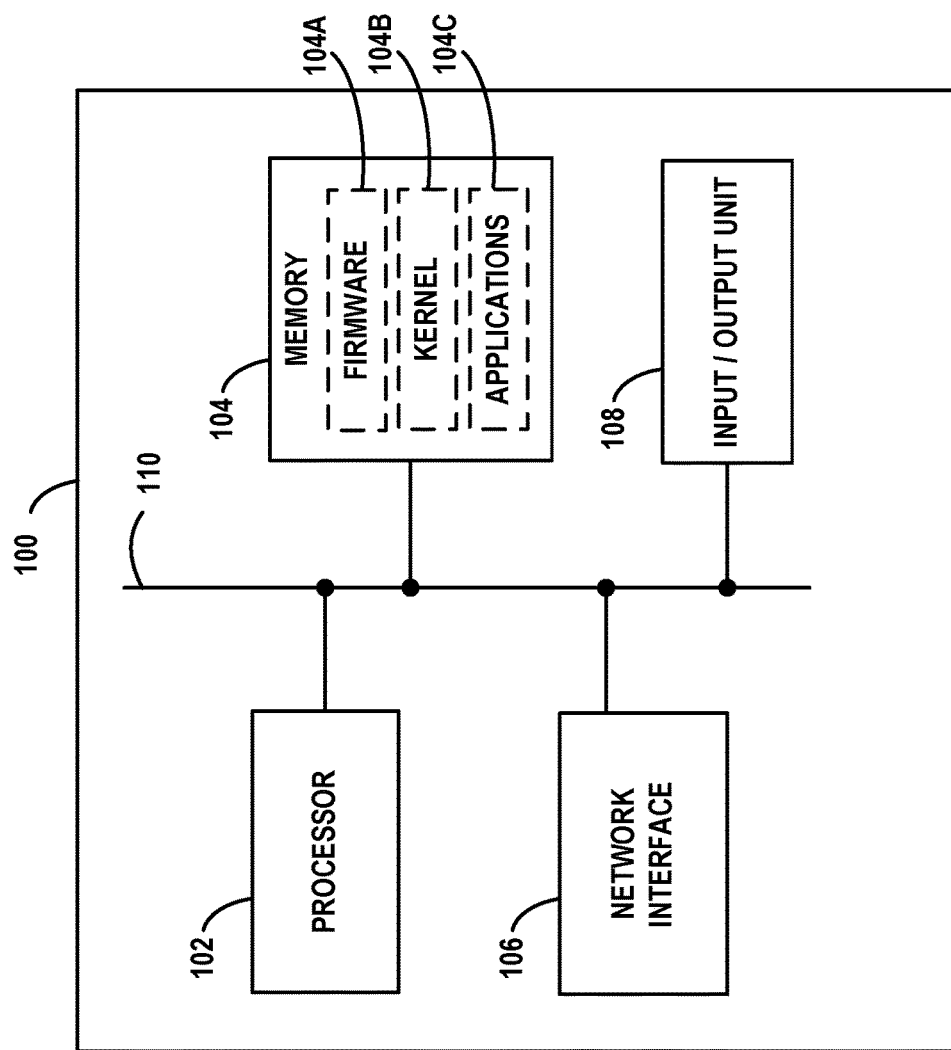
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
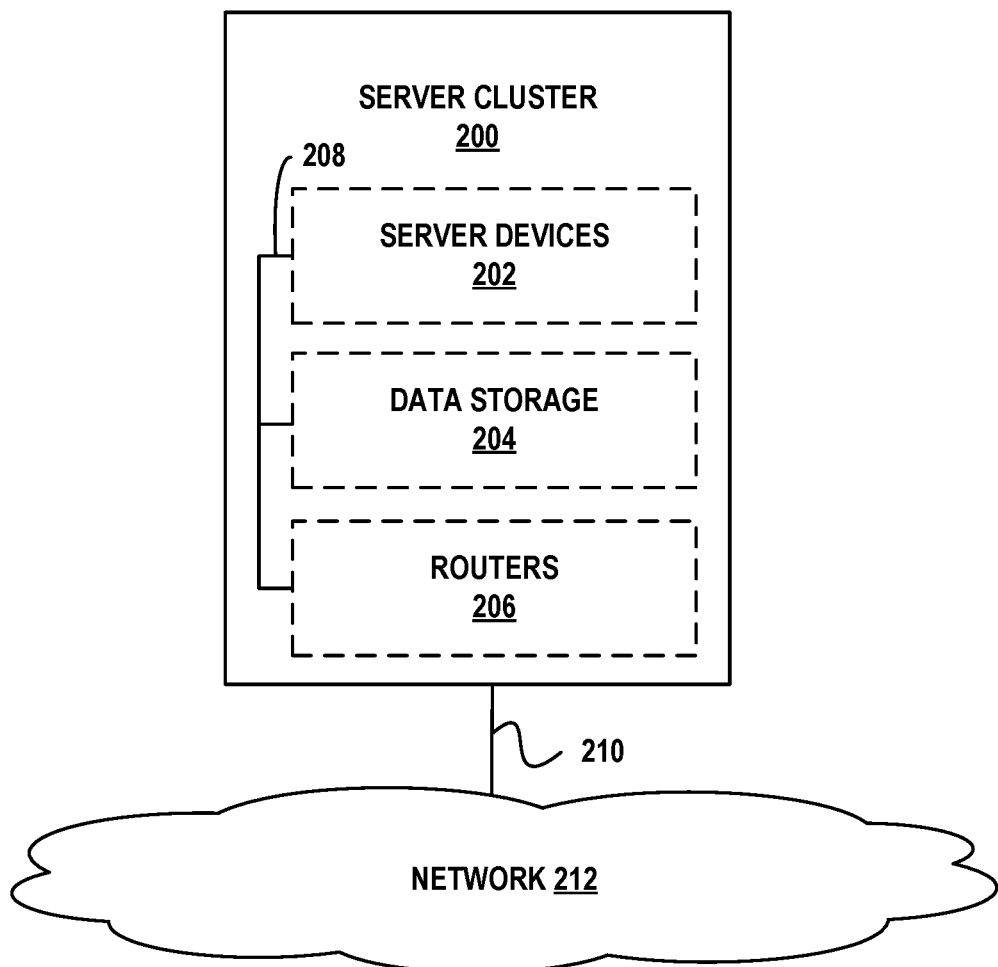
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
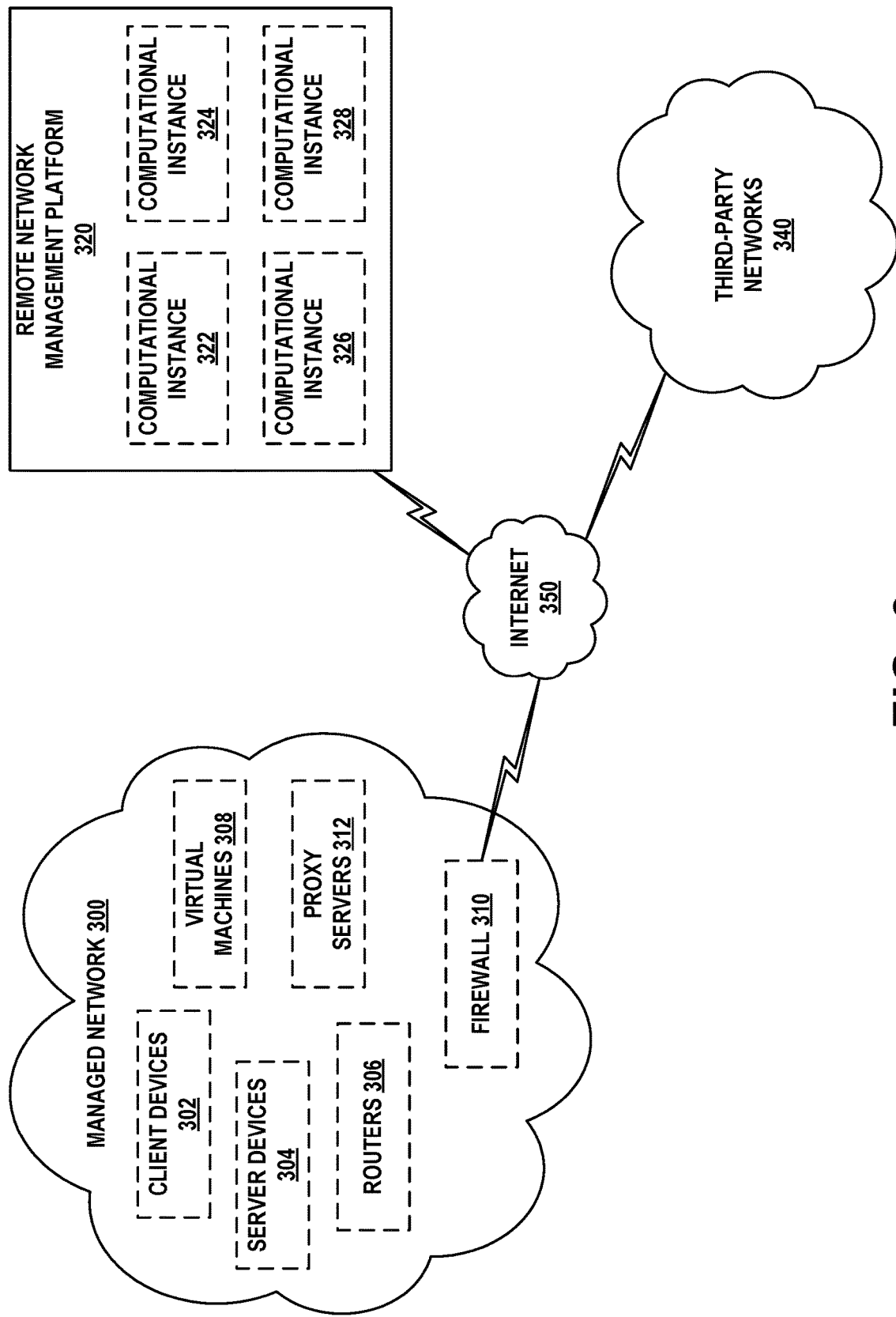
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
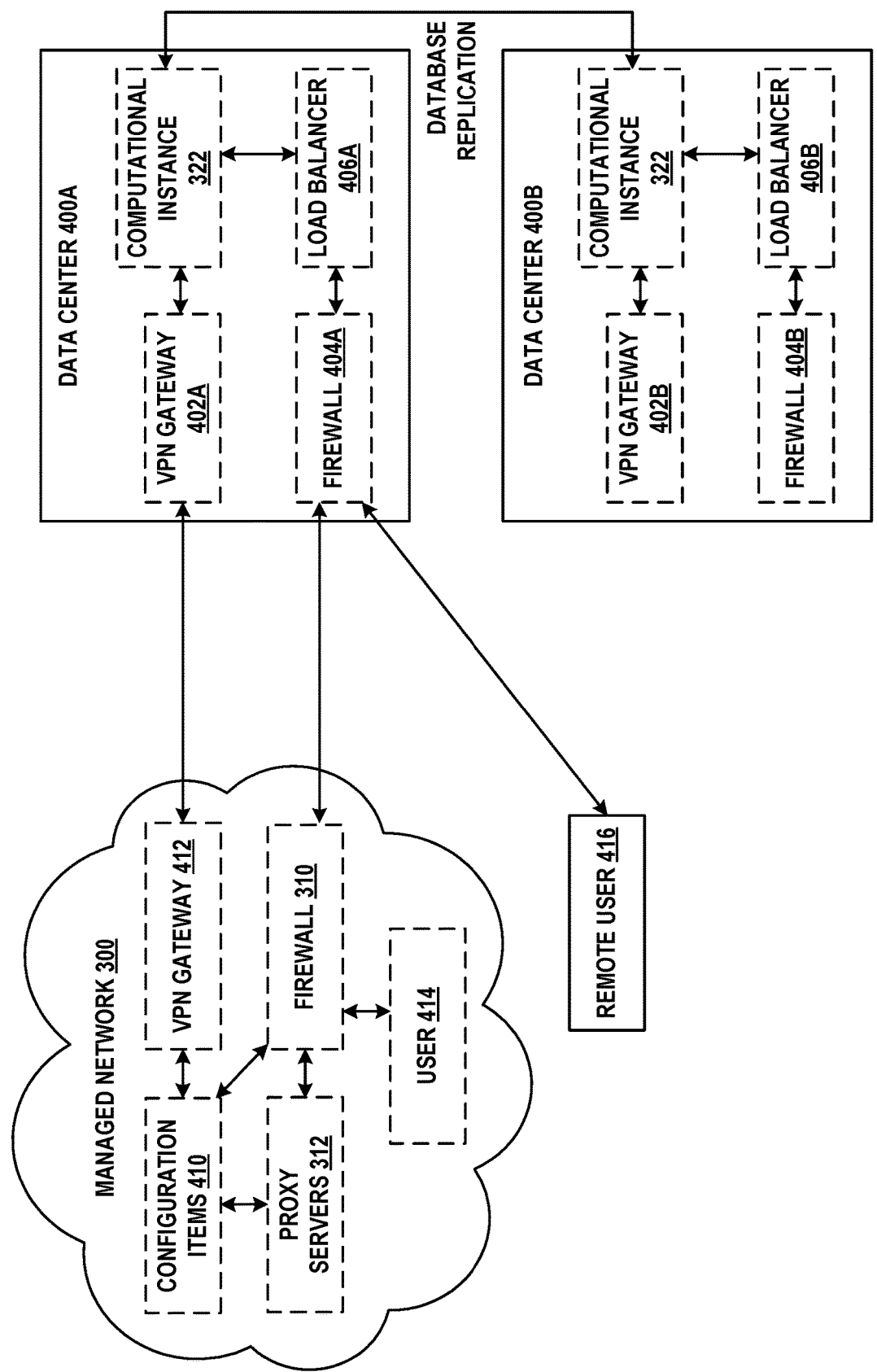
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
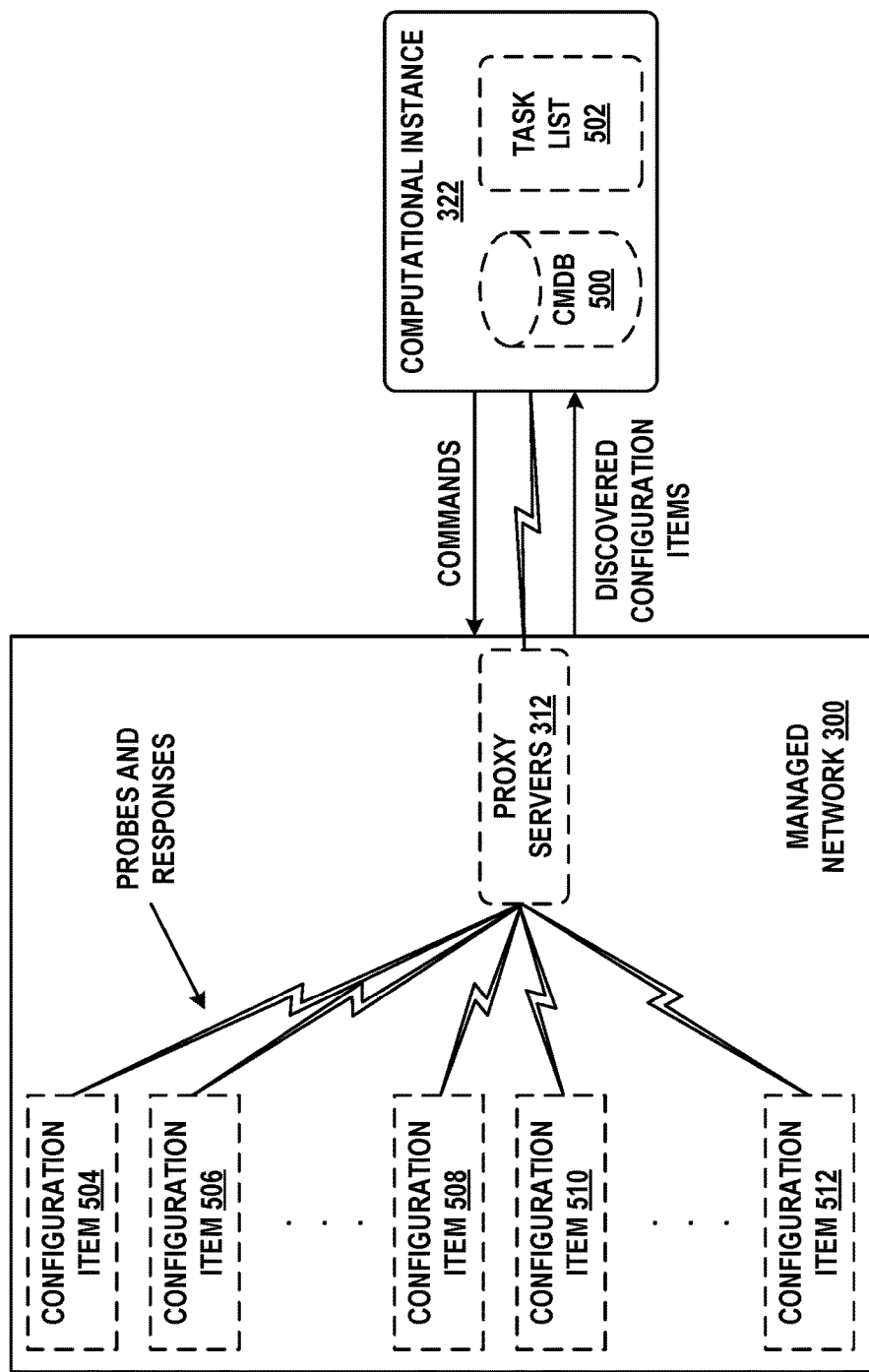
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
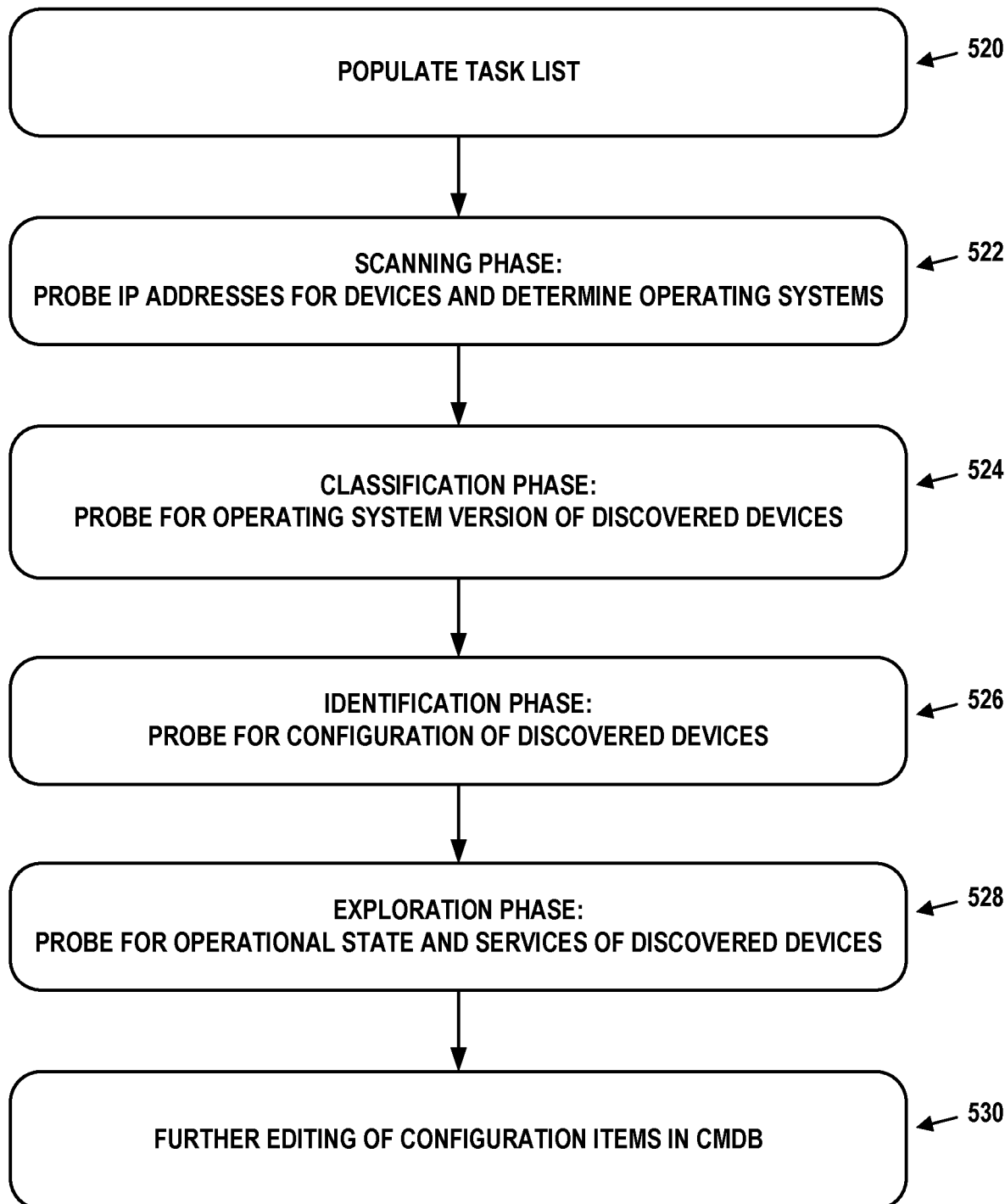
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Gateway Device Connectivity, Configuration, and Features

Figure 6:
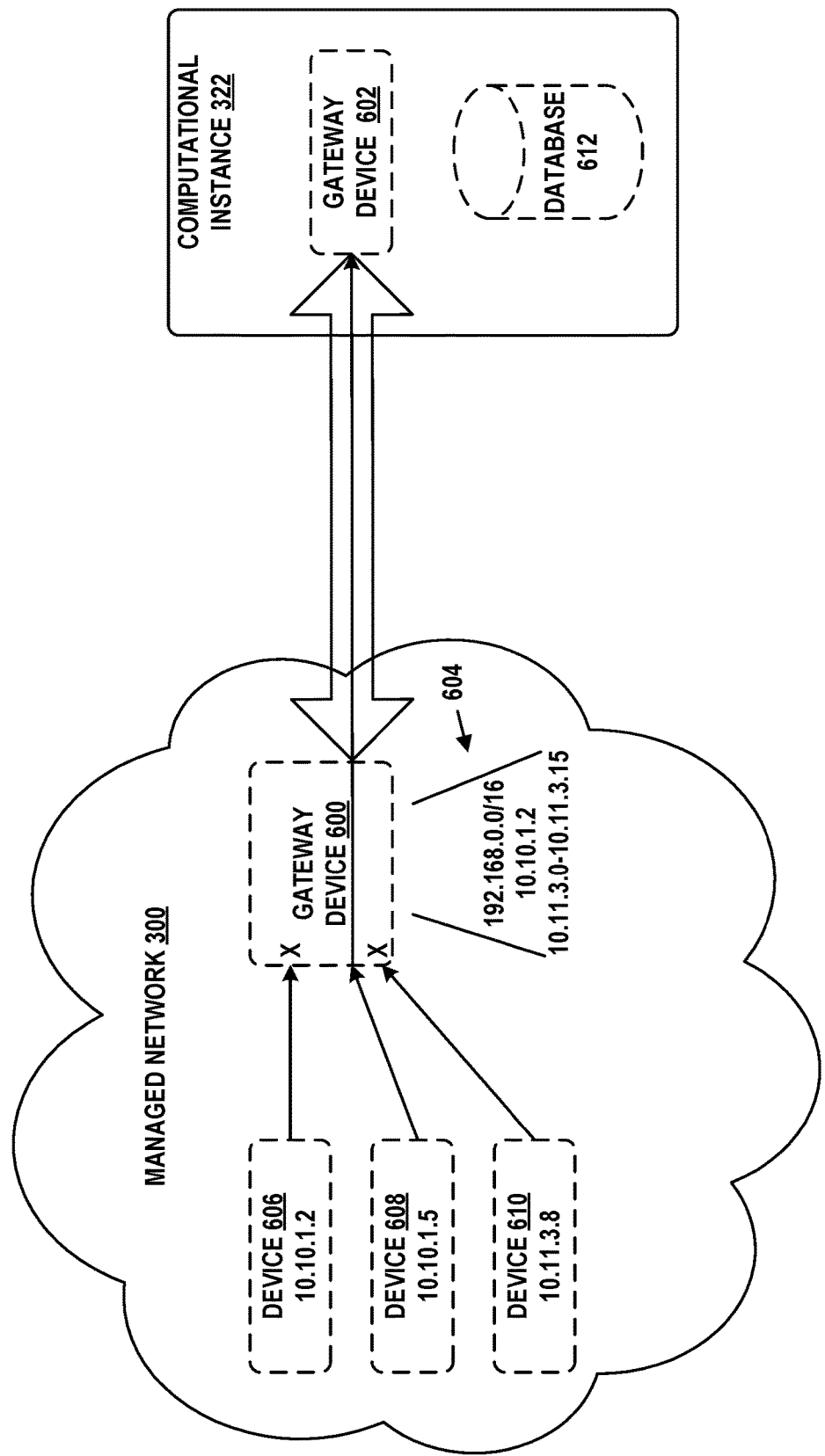
FIG. 6 depicts traffic control in a managed network, in accordance with example embodiments.

FIG. 6 depicts gateway device 600 disposed within managed network 300. Gateway device 600 is communicatively coupled to gateway device 602 in computational instance 322. These gateway devices may communicate using a VPN (as represented by the large arrow between them), and therefore may take on the functionality associated with VPN gateway 412 and VPN gateway 402, respectively, of FIG. 4. By way of the VPN, devices on managed network 300 may directly or indirectly access information in database 612 (which may be a CMDB) and/or other databases.

This VPN configuration (which may be based on IPSEC, TLS, or some other type of secure connection) may involve one or more remote subnets of IP addresses being assigned to computational instance 322. Thus, devices on managed network 300 may communicate with devices in computational instance 322 that are assigned IP addresses from these one or more remote subnets.

A. Mitigation of Security Threats

As discussed above, certain types of network activity can cause remote network management platform 320, which provides computational instance 322, to conclude that computational instance 322 is under attack. For instance, penetration testing performed by devices on managed network 300 may reach the remote subnets, and may appear to be a malicious probe of remote network management platform 320. Of course, any actual malicious probes of remote network management platform 320 by compromised devices on managed network 300 may be viewed as threats as well.

More particularly, "hackers" or other actors with bad intent may seek to deploy malware or similar tools in managed network 300, or otherwise gain access to devices on this network. Vectors of deployment include email phishing attacks, mobile applications, and software defects in general, as well as social engineering. Once a device is compromised, the attacker may attempt to identify other vulnerable devices that can potentially expand the attacker's foothold. To identify further devices, the attacker may perform scans that resemble legitimate penetration tests.

Thus, to the extent that these attacks reach computational instance 322 by way of the VPN between gateway device 600 and gateway device 602, remote network management platform 320 may be unable to determine whether the attacks are a genuine threat, or benign penetration testing by managed network 300. As a consequence, remote network management platform 320 may automatically shut down some or all access to computational instance 322 when such activity is detected. When this happens, the services of computational instance 322 may be unavailable for dozens, hundreds, or thousands of individuals using managed network 300.

In order to overcome this problem, gateway device 600 may be configured with one or more ranges (or lists) of IP addresses assigned to managed network 300. Each range may contain at least one IP address. When network traffic (e.g., packets) arrive at gateway device 600 with a source IP address which is within one of these ranges, gateway device 600 may discard, drop, or otherwise not forward the network traffic to computational instance 322. Network traffic with source IP addresses not within any of the ranges may be forwarded as usual to computational instance 322.

Therefore, the operator of managed network 300 can configure, in gateway device 600, the IP addresses of devices used for penetration testing on managed network 300. In this way, network traffic from the penetration tests will not reach computational instance 322. Additionally, the IP addresses of devices on managed network 300 that do not need to communicate with computational instance 322 may also be configured in gateway device 600.

As an example, FIG. 6 shows gateway device 600 configured with network addresses 604. As shown, network addresses 604 include three IP address ranges (alternatively, a list with three entries). These ranges are 192.168.0.0/16, 10.10.1.2, and 10.11.3.0-10.11.3.15. The notation 192.168.0.0/16 is shorthand for the range 192.168.0.0-192.168.255.255 (the "/16" indicates that the 16 most significant bits are static). Network traffic reaching gateway device 600 from a source address in one of these ranges may be discarded, dropped, or otherwise not forwarded to computational instance 322.

Thus, as shown in FIG. 6, network traffic from device 606, with IP address 10.10.1.2, is blocked, because IP address 10.10.1.2 is included in addresses 604. Similarly, network traffic from device 610, with IP address 10.11.3.8, is blocked, because IP address 10.11.3.8 is included the range 10.11.3.0-10.11.3.15. However, network traffic from device 608, with IP address 10.10.1.5, is not blocked because it is not included in addresses 604.

Still, this mechanism is not enough. Modern enterprise networks are large, with a diverse array of devices coming to and being removed from the network. Many enterprise users have both laptops and mobile devices that spend a significant amount of time both inside and outside of the enterprise network. Thus, they can be infected with a virus, Trojan horse, or some other form of malware while on a public network, then bring this threat into the enterprise.

Furthermore, threat vectors within an enterprise network are becoming more numerous and sophisticated. For instance, a successful email phishing attack can result in a user inadvertently downloading malware to his or her device from an innocent-looking email attachment. This malware may then seek to discover sensitive information on the device, determine the topological configuration of the enterprise network, and/or spread to other devices on the network.

Thus, a static configuration of IP address ranges is unlikely to be able to keep up with devices that access managed network 300 dynamically (and therefore may be assigned different IP addresses each time), or devices with relatively static IP address assignments that suddenly become compromised.

B. Dynamic Updates to Blocked Network Addresses

Figure 7A:
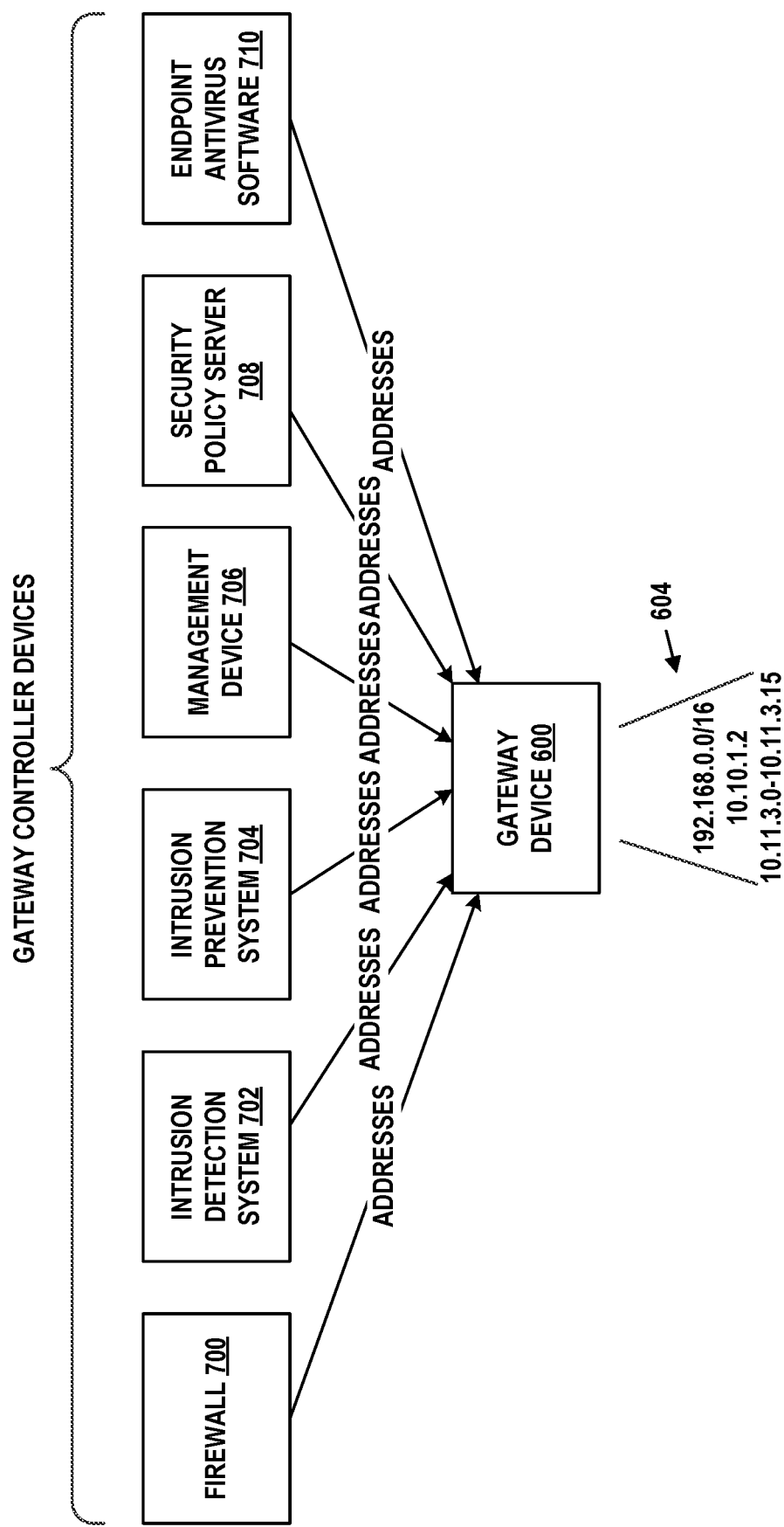
FIG. 7A depicts provisioning of network addresses into a gateway device, in accordance with example embodiments.
Figure 7B:
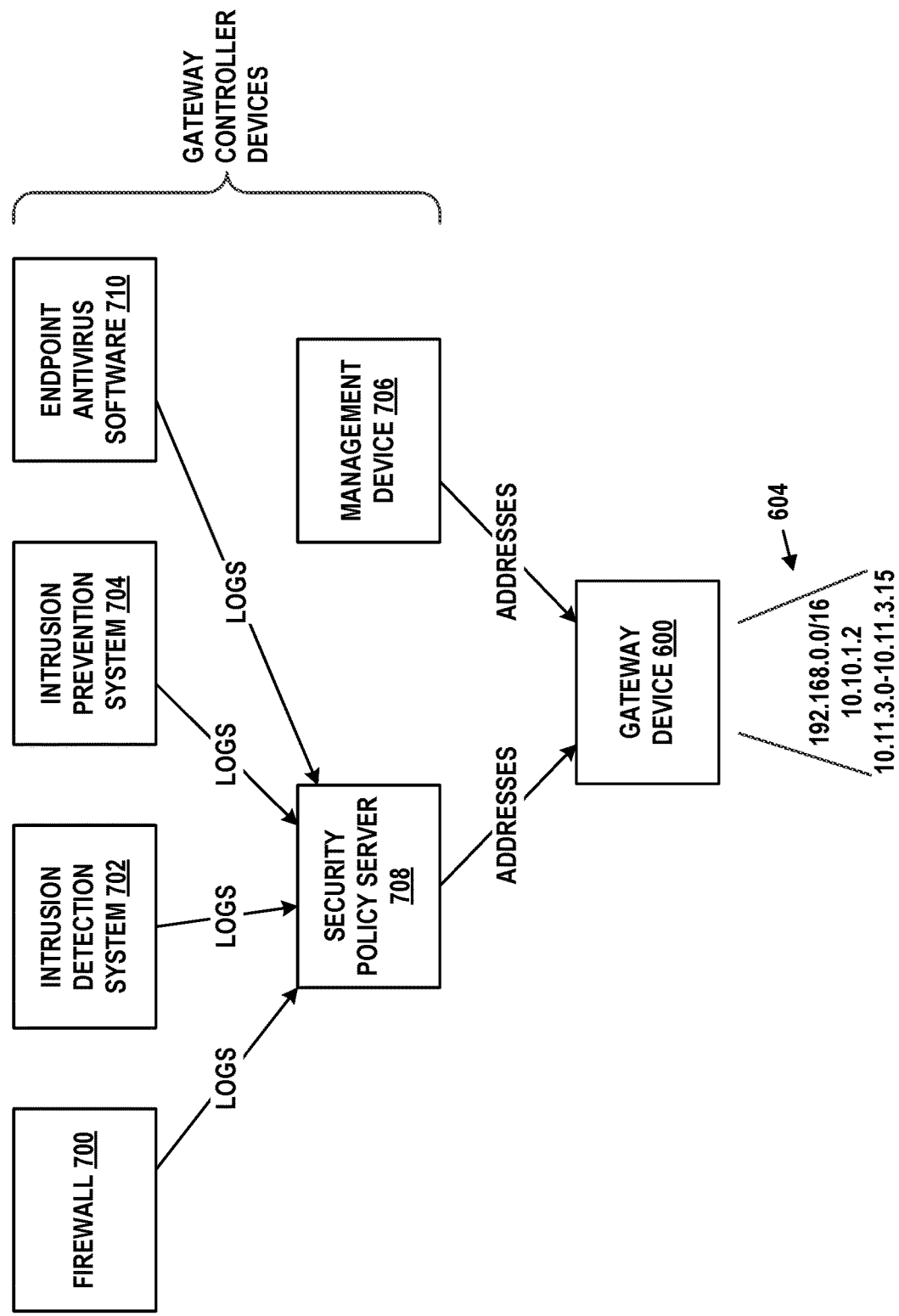
FIG. 7B also depicts provisioning of network addresses into a gateway device, in accordance with example embodiments.

FIGS. 7A and 7B depict example architectures that support dynamically detecting when a device on managed network 300 is potentially compromised, and responsively updating network addresses 604 to block network traffic sourced by the device's network addresses(es) from being routed to computational instance 322. Notably, managed network 300 may include a number of security devices that detect various types of threats, and these devices may provide network addresses associated with these threats to gateway device 600. Upon receipt of these addresses, gateway device 600 may update network addresses 604 accordingly.

As noted above, a firewall, such as firewall 700, may be one or more specialized routers or server devices that protect managed network 300 from unauthorized attempts to access the devices, applications, and services therein, while allowing authorized communication.

Intrusion detection system 702 may be a device or application that monitors a network (usually in a passive fashion) for malicious activity or policy violations. Intrusion prevention system 704 may be a form of intrusion detection system that has at least some capability to respond to detected threats. For instance, an intrusion prevention system may be able to dynamically configure a firewall to block an attack or dynamically change the content of network traffic involved in the attack. For purposes of FIG. 7A, there might not be a significant difference between intrusion detection system 702 and intrusion prevention system 704.

Management device 706 may be a computing device accessed by a human (e.g., a system administrator of managed network 300). From management device 706, the human may be able to manually configure network addresses 604 to include additional addresses suspected of being associated with a threat. Also, particular addresses may be removed from network addresses 604 when a threat associated with those particular addresses is considered to be resolved.

Security policy server 708 may be a device that contains a set of general security policies for managed network 300, such as firewall policies, router policies, endpoint policies, access control lists, and so on. From time to time, security policy server 708 may provide relevant portions of these policies to firewalls, routers, endpoints, and so on.

Endpoint antivirus software 710 may be deployed throughout managed network on various computing devices (e.g., PCs, laptops, and so on). This software may periodically or dynamically scan the working environment of these computing devices for security threats and/or anomalies.

For purpose of this discussion, firewall 700, intrusion detection system 702, intrusion prevention system 704, management device 706, security policy server 708, and endpoint antivirus software 710 are considered examples of gateway controller devices. Other examples exist. A gateway controller device is any device that can directly or indirectly update network addresses 604 on gateway device 600. Thus, as shown in FIG. 7A, each of these types of gateway controller device may dynamically provide one or more additional addresses for inclusion within network addresses 604.

FIG. 7B depicts an alternative arrangement of the same devices. Instead of providing network addresses directly to gateway device 600, firewall 700, intrusion detection system 702, intrusion prevention system 704, and endpoint antivirus software 710 provide logs to security policy server 708 (or a similar device). Each of these logs may be in the respective sender's native format. Security policy server 708 then parses these logs to identify additional network addresses to be added to network addresses 604.

A sample log entry is shown below. The format of this log entry is for purpose of example. Numerous other log entry formats may be used, and various devices may support different formats.

```
Jan 29, 2017 11:47:39 10.11.4.2 timezone="PST"
device_name="CR25iNG" log_id=020803407001 log_type="IDS"
priority=Warning ids_policy_id=5 msg="Port scan detected"
src_ip=10.11.4.7 dst_ip=10.11.4.17 protocol="TCP"
```

This particular log entry indicates that at 11:47 AM Pacific Standard Time on Jan. 29, 2017, a device with an IP address of 10.11.4.2 detected a TCP port scan originating from a device with an IP address of 10.11.4.7 and targeting a device with an IP address of 10.11.4.17. A port scan can be part of a penetration test, but also could be malware seeking to discover known security flaws in network applications available at the device with the IP address of 10.11.4.17. The type of log is "IDS" and the priority level is "Warning". This indicates that the device with the IP address of 10.11.4.2 is probably an IDS that passively detected the port scan, and that this activity is cause for concern.

Security policy server 708 may parse this log entry by applying particular rules. These rules may indicate that when the entry's priority level is "Warning" or higher, the source IP address that caused the logged event should be added to network addresses 604. Therefore, security policy server 708 may parse the entry for the "priority=" term and the "src_ip=" term. If the priority level is "Warning" as it is in this example, security policy server 708 may provide the IP address of "10.11.4.7" to gateway device 600. In response, gateway device 600 may add this address to network addresses 604.

In this way, computational instance 322 can be quickly protected from emerging security threats and threat vectors originating from managed network 300.

C. Selective Database Field Encryption and Decryption

Given the position of the gateway device in the network architecture, this device may also be able to carry out additional security measures. For example, devices on a managed network may store sensitive information (e.g., passwords, social security numbers, birthdays, credit card numbers, etc.) in a database within a computational instance. While this information is encrypted when traveling between the gateway device and the computational instance, it may be stored in plaintext format otherwise. Alternatively, the database may separately encrypt/decrypt the information, but this may require that the cryptographic keys for doing so are stored in the computational instance. As a result, these stored keys can be an attractive target for hackers.

As an alternative, the gateway device may be configured to selectively encrypt certain information that is targeted for storage in particular database fields. In other words, the gateway device may parse incoming storage commands for these fields, encrypt their contents, and forward the storage commands with the encrypted fields to the database for storage. When retrieving this information from the database, the reverse process may take place. This results in the information in these fields being encrypted when stored in the computational instance and when communicated between the managed network and the computational instance. Additionally, the cryptographic keys can be stored in the managed network rather than the computational instance.

Figure 7C:
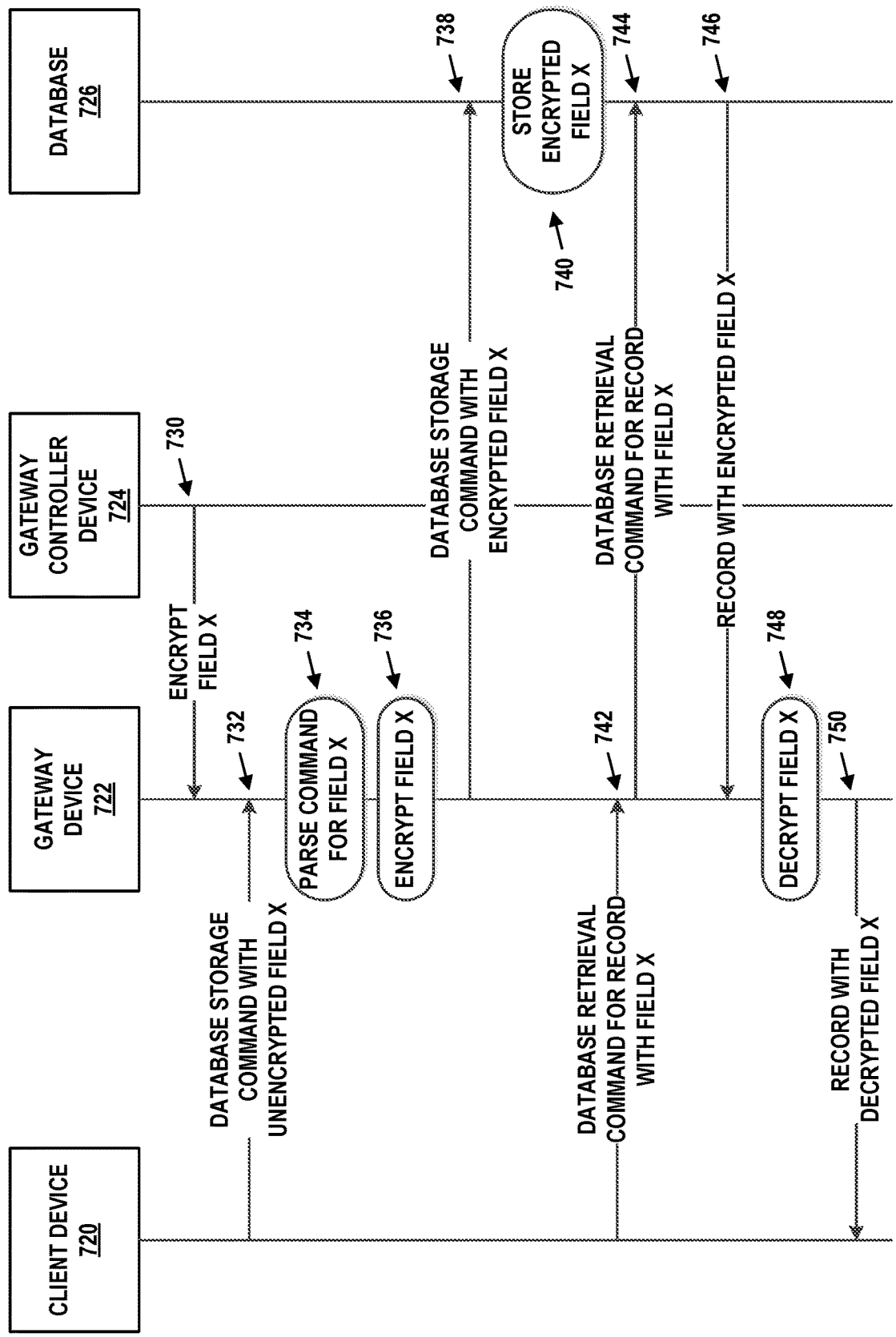
FIG. 7C depicts a message flow diagram, in accordance with example embodiments.

FIG. 7C depicts client device 720 storing and retrieving data from database 726 by way of gateway device 722. As discussed above, gateway device 722 may be disposed within a managed network and database 726 may be disposed within a computational instance of a remote network management platform. Gateway device 722 may communicate with the computational instance over a secure connection, such as a VPN.

At step 730, gateway controller device 724 may transmit a command to gateway device 722. The command may instruct gateway device 722 to encrypt occurrences of field X in writes to database 726.

At step 732, client device 720 may transmit, to gateway device 722, a database storage command with unencrypted field X. While this database storage command may be formatted in various ways, an example JavaScript Object Notation (JSON) format is shown below.

```
{
    "employees": [
        {
            "emp_id": "12345",
            "fname": "Alice",
            "lname": "Jones",
            "SSN": "000-00-0000"
        }
    ]
}
```

Here, it is assumed that field X refers to the "SSN" field, a field that contains sensitive personal information. Accordingly, at step 734, gateway device 722 may parse the storage command for this field. After the field is found, at step 736, gateway device 722 may encrypt the field. After doing so, the storage command may appear as shown below. Notably, only the contents of the "SSN" field have been encrypted. The key used for this encryption may be stored at gateway device 722 or in a manner such that it is accessible to gateway device 722.

```
{
    "employees": [
        {
            "emp_id": "12345",
            "fname": "Alice",
            "lname": "Jones",
            "SSN": "qIqpcy6LAGakrSM"
        }
    ]
}
```

At step 738, gateway device 722 may transmit the storage command with the encrypted field to database 726. At step 740, database 726 may store, in one or more retrievable records, the fields in the storage command. Notably, the contents of the "SSN" field are stored as encrypted.

At step 742, client device 720 may transmit, to gateway device 722, a database retrieval command for the stored record containing the unencrypted SSN field. At step 744, gateway device 722 may transmit the retrieval command to database 726. At step 746, after retrieving the record, database 726 may transmit the record to gateway device 722. The contents of the "SSN" field may be encrypted as shown above.

At step 748, gateway device 722 may use the stored key to decrypt the encrypted "SSN" field. At step 750, gateway device 722 may transmit the record, with the "SSN" field decrypted, to client device 720.

In some embodiments, gateway device 722 may be configured to encrypt one or more fields within one or more records. To do so, gateway device 722 may perform its parsing and analysis of the storage command on the command as a whole, rather than on individual packets in which the storage command is transmitted. In other words, gateway device 722 may wait until some or all packets of a multi-packet message are received before attempting to parse any storage commands in this message.

Furthermore, in the case that the storage command seeks to store a file either in database 726 or in a file system associated with database 726, gateway device 722 may be configured to encrypt this file. For instance, gateway device 722 may be configured to encrypt any file stored in association with database 726.

The embodiments of this subsection may operate on a standalone basis or be combined with those of the previous subsection. For example, when the storage command is received at step 732, gateway device 722 may compare the source IP address of the storage command to any IP address ranges that are excluded from accessing the computational instance. Only if the source IP address of the storage command is not within any of these ranges will gateway device 722 encrypt the appropriate fields and transmit the storage command with these fields encrypted to database 726. This transmission of the storage command may also be subject to any encryption typically performed by the secure connection between gateway device 722 and the computational instance.

This may result in two layers of encryption being applied—encryption of all communication between gateway device 722 and an associated gateway in the computational instance using a first cryptosystem, and encryption of specific fields and/or files stored in database 728 using a second cryptosystem. The first and second cryptosystems may use different cryptographic techniques and/or different keys.

In addition to encryption functionality, gateway device 722 may also "tokenize" data within fields sent from client device 720 to database 726. Tokenization involves predefined patterns of the data being replaced by one or more tokens prior to gateway device 722 transmitting the data. Patterns may be specified as a sequence of characters or as a regular expression, for instance. Gateway device 722 replaces each string matching the pattern with a token of the same size as the string. In the opposite direction (from database 726 to client device 720), gateway device 722 replaces the token with the string. To do this, gateway device 722 may store, in a local database, strings that have matched patterns and their associated tokens.

Tokens may be generated by gateway device 722 applying a randomizing hash function (e.g., a one-way function) to strings that match patterns. This results in unique, yet separate, randomly generated tokens to replace strings. A difference between encrypting data and tokenizing data is that tokenizing data does not require specification or use of an encryption key or a specific type of encryption. Thus, tokenizing data is simpler, while encrypting the data is more secure.

VI. Example Operations

Figure 8A:
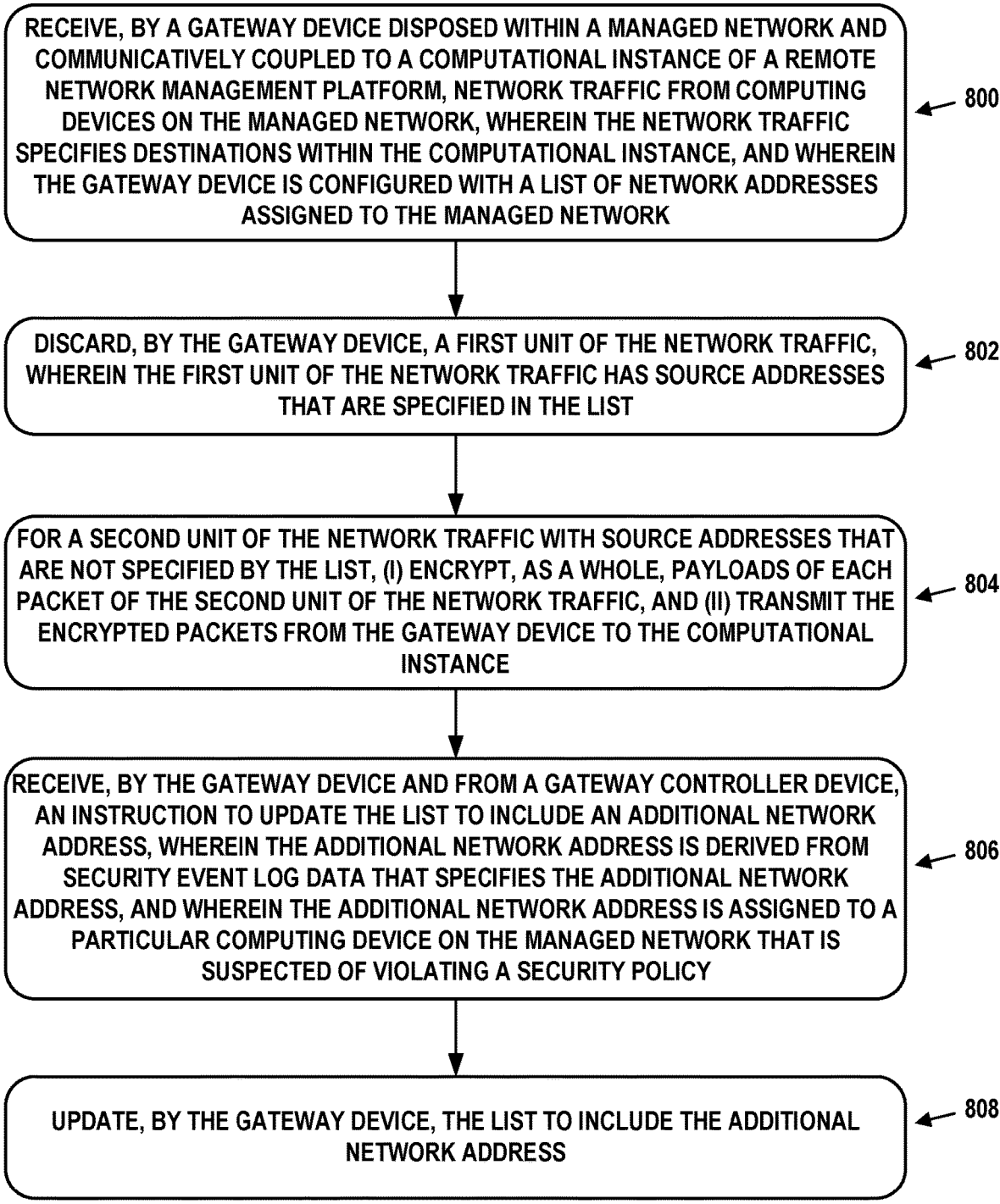
FIG. 8A is a flow chart, in accordance with example embodiments.
Figure 8B:
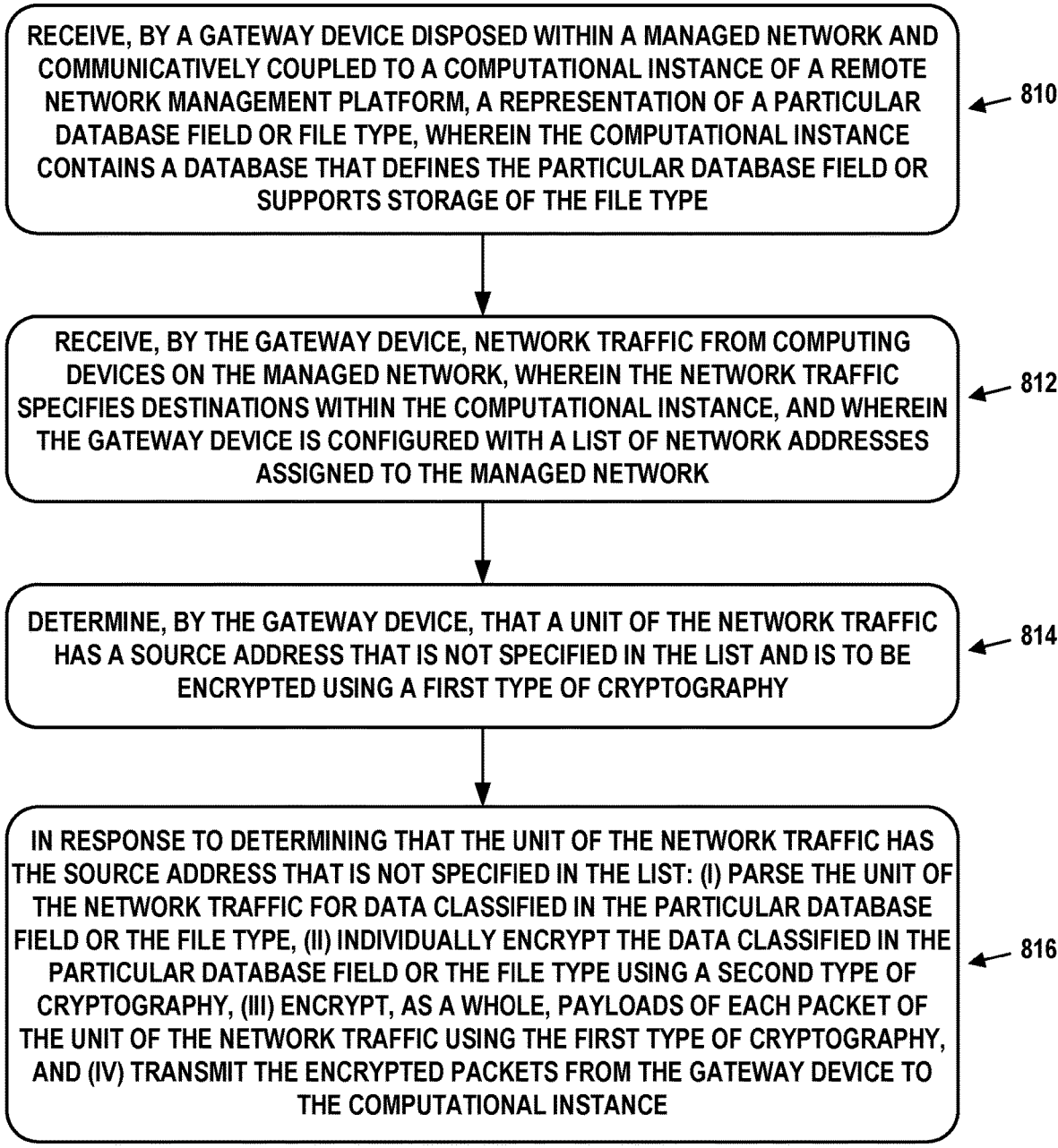
FIG. 8B is another flow chart, in accordance with example embodiments.

FIGS. 8A and 8B are flow charts illustrating example embodiments. The processes illustrated by FIGS. 8A and 8B may be carried out by a computing device, such as computing device 100, and/or a cluster of computing devices, such as server cluster 200. However, the processes can be carried out by other types of devices or device subsystems. For example, the processes could be carried out by a portable computer, such as a laptop or a tablet device. Thus, a gateway device may take the form of any of these components.

The embodiments of FIGS. 8A and 8B may be simplified by the removal of any one or more of the features shown therein. Further, these embodiments may be combined with features, aspects, and/or implementations of any of the previous figures or otherwise described herein.

Block 800 of FIG. 8A may involve receiving, by a gateway device disposed within a managed network and communicatively coupled to a computational instance of a remote network management platform, network traffic from computing devices on the managed network. The network traffic may specify destinations within the computational instance. The gateway device may be configured with a list of network addresses assigned to the managed network.

Block 802 may involve discarding, by the gateway device, a first unit of the network traffic. The first unit of the network traffic may have source addresses that are specified in the list. Herein, a "unit of network traffic" may refer to one or more packets or messages.

Block 804 may involve, for a second unit of the network traffic with source addresses that are not specified by the list, the gateway device (i) encrypting, as a whole, payloads of each packet of the second unit of the network traffic, and (ii) transmitting the encrypted packets from the gateway device to the computational instance.

Block 806 may involve receiving, by the gateway device and from a gateway controller device, an instruction to update the list to include an additional network address. The additional network address may be derived from security event log data that specifies the additional network address. The additional network address may be assigned to a particular computing device on the managed network that is suspected of violating a security policy.

Block 808 may involve updating, by the gateway device, the list to include the additional network address.

In some embodiments, the computational instance contains a database that defines a plurality of database fields. These embodiments may also involve a second gateway controller device disposed within the managed network and communicatively coupled to the gateway device. The second gateway controller device may be configured to: obtain a representation of a particular database field that is defined in the plurality of database fields, and transmit, to the gateway device, the representation of the particular database field. The gateway device may be further configured to: receive the representation of the particular database field, parse the second unit of the network traffic for data classified in the particular database field, and prior to encrypting the payloads of each packet of the second unit of the network traffic, individually encrypt the data classified in the particular database field. In some embodiments, the second gateway controller device includes or is the same as the first gateway controller device.

In some embodiments, the second unit of the network traffic contains the particular database field in a markup language representation (e.g., HTML or XML). Parsing the second unit of the network traffic for data classified in the particular database field may involve parsing the markup language representation for the particular database field.

In some embodiments, the second unit of the network traffic contains the particular database field in a data interchange format representation (e.g., JSON). Parsing the second unit of the network traffic for data classified in the particular database field may involve parsing the data interchange format representation for the particular database field.

In some embodiments, encrypting the payloads of each packet of the second unit of the network traffic uses a first type of cryptography, and individually encrypting the data classified in the particular database field uses a second type of cryptography. The individually encrypted data might not be able to be decrypted using the first type of cryptography.

In some embodiments, transmitting the encrypted packets from the gateway device to the computational instance comprises transmitting the encrypted packets to a second gateway device within the computational instance. The second gateway device may be configured to decrypt the packets using the first type of cryptography. The second gateway device may forward the individually encrypted data in the particular database field to the database.

In some embodiments, the particular database field specifies a file type that is stored in a file system associated with the database. Parsing the second unit of the network traffic for data classified in the particular database field may involve parsing the second unit of the network traffic for a file of the file type. Individually encrypting the data classified in the particular database field may involve encrypting the file.

In some embodiments, encryption of the payloads of each packet of the second unit of the network traffic comprises transport layer security encryption.

In some embodiments, the gateway controller device is one of an intrusion detection system, intrusion prevention system, or firewall. Alternatively, the gateway controller device receives the security event log data from one of an intrusion detection system, intrusion prevention system, or firewall.

In some embodiments, the gateway controller device is further configured to parse the security event log data to determine that the additional network address is associated with a suspected violation of the security policy.

FIG. 8B is a flow chart depicting an alternative embodiment. In FIG. 8B, block 810 may involve receiving, by a gateway device disposed within a managed network and communicatively coupled to a computational instance of a remote network management platform, a representation of a particular database field or file type. The computational instance may contain a database that defines the particular database field and/or supports storage of the file type.

Block 812 may involve receiving, by the gateway device, network traffic from computing devices on the managed network. The network traffic may specify destinations within the computational instance. The gateway device may be configured with a list of network addresses assigned to the managed network.

Block 814 may involve determining, by the gateway device, that a unit of the network traffic has a source address that is not specified in the list and is to be encrypted using a first type of cryptography.

Block 816, may involve, possibly in response to determining that the unit of the network traffic has the source address that is not specified in the list, the gateway device: (i) parsing the unit of the network traffic for data classified in the particular database field or the file type, (ii) individually encrypting the data classified in the particular database field or the file type using a second type of cryptography, (iii) encrypting, as a whole, payloads of each packet of the unit of the network traffic using the first type of cryptography, and (iv) transmitting the encrypted packets from the gateway device to the computational instance.

The embodiments of FIG. 8B may include any of the features, variations, and/or alternative embodiments discussed in connection with FIG. 8A or any previous figure.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
  a gateway device disposed within a managed network and communicatively coupled to a computational instance of a remote network management platform, wherein the gateway device is configured with a list of network addresses assigned to the managed network, and wherein the gateway device is configured to:
    receive network traffic from computing devices on the managed network, wherein the network traffic specifies destinations within the computational instance,
    compare source addresses of the network traffic to the network addresses in the list,
    discard a first unit of the network traffic, wherein the first unit of the network traffic has source addresses that are specified in the list, and
    for a second unit of the network traffic with source addresses that are not specified by the list, (i) encrypt, as a whole, payloads of each packet of the second unit of the network traffic, and (ii) transmit the encrypted packets from the gateway device to the computational instance; and
  a gateway controller device disposed within the managed network and communicatively coupled to the gateway device, wherein the gateway controller device is configured to:
    obtain security event log data that specifies an additional network address assigned to a particular computing device on the managed network, wherein the particular computing device is suspected of violating a security policy, and
    transmit, to the gateway device, an instruction to update the list to include the additional network address specified by the security event log data.

2. The system of claim 1, wherein the gateway device is further configured to:
  receive the instruction, and
  update the list to include the additional network address specified by the security event log data.

3. The system of claim 1, wherein the computational instance contains a database that defines a plurality of database fields, the system further comprising:
  a second gateway controller device disposed within the managed network and communicatively coupled to the gateway device, wherein the second gateway controller device is configured to:
    obtain a representation of a particular database field that is defined in the plurality of database fields, and
    transmit, to the gateway device, the representation of the particular database field; and
  wherein the gateway device is further configured to:
    receive the representation of the particular database field,
    parse the second unit of the network traffic for data classified in the particular database field, and
    prior to encrypting the payloads of each packet of the second unit of the network traffic, individually encrypt the data classified in the particular database field.

4. The system of claim 3, wherein the second unit of the network traffic contains the particular database field in a markup language representation, and wherein parsing the second unit of the network traffic for data classified in the particular database field comprises parsing the markup language representation for the particular database field.

5. The system of claim 3, wherein the second unit of the network traffic contains the particular database field in a data interchange format representation, and wherein parsing the second unit of the network traffic for data classified in the particular database field comprises parsing the data interchange format representation for the particular database field.

6. The system of claim 3, wherein the second gateway controller device comprises the first gateway controller device.

7. The system of claim 3, wherein encrypting the payloads of each packet of the second unit of the network traffic uses a first type of cryptography, and wherein individually encrypting the data classified in the particular database field uses a second type of cryptography, wherein the individually encrypted data cannot be decrypted using the first type of cryptography.

8. The system of claim 7, wherein transmitting the encrypted packets from the gateway device to the computational instance comprises transmitting the encrypted packets to a second gateway device within the computational instance, wherein the second gateway device is configured to decrypt the packets using the first type of cryptography, and wherein the second gateway device forwards the individually encrypted data in the particular database field to the database.

9. The system of claim 3, wherein the particular database field specifies a file type that is stored in a file system associated with the database, wherein parsing the second unit of the network traffic for data classified in the particular database field comprises parsing the second unit of the network traffic for a file of the file type, and wherein individually encrypting the data classified in the particular database field comprises encrypting the file.

10. The system of claim 1, wherein encryption of the payloads of each packet of the second unit of the network traffic comprises transport layer security encryption.

11. The system of claim 1, wherein the gateway controller device is one of an intrusion detection system, intrusion prevention system, or firewall.

12. The system of claim 1, wherein the gateway controller device receives the security event log data from one of an intrusion detection system, intrusion prevention system, or firewall.

13. The system of claim 1, wherein the gateway controller device is further configured to parse the security event log data to determine that the additional network address is associated with a suspected violation of the security policy.

14. A method comprising:
receiving, by a gateway device disposed within a managed network and communicatively coupled to a computational instance of a remote network management platform, network traffic from computing devices on the managed network, wherein the network traffic specifies destinations within the computational instance, and wherein the gateway device is configured with a list of network addresses assigned to the managed network;
discarding, by the gateway device, a first unit of the network traffic, wherein the first unit of the network traffic has source addresses that are specified in the list;
for a second unit of the network traffic with source addresses that are not specified by the list, the gateway device (i) encrypting, as a whole, payloads of each packet of the second unit of the network traffic, and (ii) transmitting the encrypted packets from the gateway device to the computational instance;
receiving, by the gateway device and from a gateway controller device, an instruction to update the list to include an additional network address, wherein the additional network address is derived from security event log data that specifies the additional network address, and wherein the additional network address is assigned to a particular computing device on the managed network that is suspected of violating a security policy; and
updating, by the gateway device, the list to include the additional network address.

15. The method of claim 14, wherein the second unit of the network traffic contains the particular database field in a data interchange format representation, and wherein parsing the second unit of the network traffic for data classified in the particular database field comprises parsing the data interchange format representation for the particular database field.

16. The method of claim 14, wherein the computational instance contains a database that defines a plurality of database fields, the method further comprising:
receiving, from a second gateway controller device, the representation of a particular database field defined in the plurality of database fields;
parsing the second unit of the network traffic for data classified in the particular database field; and
prior to encrypting the payloads of each packet of the second unit of the network traffic, individually encrypting the data classified in the particular database field.

17. The method of claim 16, wherein encrypting payloads of each packet of the second unit of the network traffic uses a first type of cryptography, and wherein individually encrypting the data classified in the particular database field uses a second type of cryptography, wherein the individually encrypted data cannot be decrypted using the first type of cryptography.

18. The method of claim 17, wherein transmitting the encrypted packets from the gateway device to the computational instance comprises transmitting the encrypted packets to a second gateway device disposed within the computational instance, wherein the second gateway device is configured to decrypt the packets using the first type of cryptography, and wherein the individually encrypted data in the particular database field is transmitted to the database.

19. The method of claim 14, wherein the particular database field specifies a file type that is stored in a file system associated with the database, wherein parsing the second unit of the network traffic for data classified in the particular database field comprises parsing the second unit of the network traffic for a file of the file type, and wherein individually encrypting the data classified in the particular database field comprises encrypting the file.

20. A method comprising:
receiving, by a gateway device disposed within a managed network and communicatively coupled to a computational instance of a remote network management platform, a representation of a particular database field or file type, wherein the computational instance contains a database that defines the particular database field or supports storage of the file type;
receiving, by the gateway device, network traffic from computing devices on the managed network, wherein the network traffic specifies destinations within the computational instance, and wherein the gateway device is configured with a list of network addresses assigned to the managed network;

determining, by the gateway device, that a unit of the network traffic has a source address that is not specified in the list and is to be encrypted using a first type of cryptography; and in response to determining that the unit of the network traffic has the source address that is not specified in the list, the gateway device: (i) parsing the unit of the network traffic for data classified in the particular database field or the file type, (ii) individually encrypting the data classified in the particular database field or the file type using a second type of cryptography, (iii) encrypting, as a whole, payloads of each packet of the unit of the network traffic using the first type of cryptography, and (iv) transmitting the encrypted packets from the gateway device to the computational instance.

* * * * *